J. MANSFIELD.
Milk Cooler.
No. 22,660.
Patented Jan'y 18, 1859.
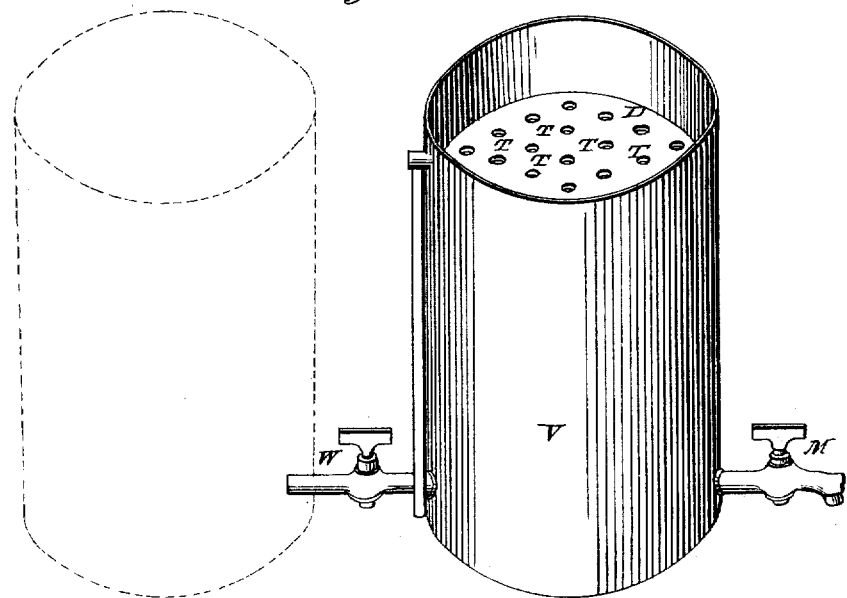
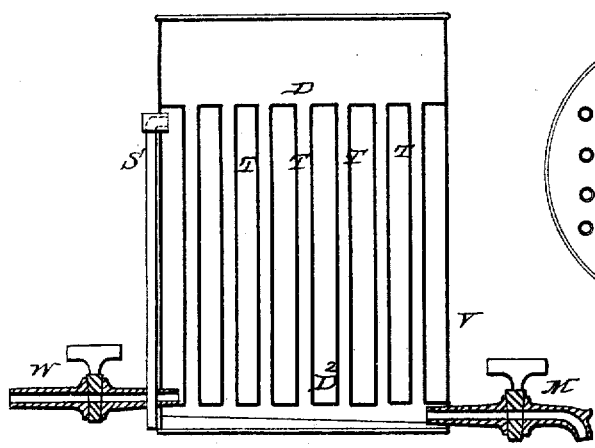
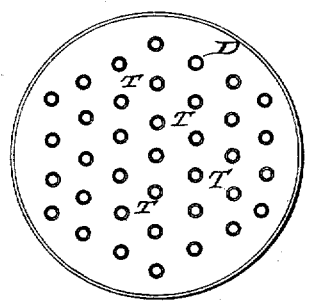

UNITED STATES PATENT OFFICE.

JOSEPH MANSFIELD, OF JEFFERSON, WISCONSIN.

MILK-COOLER.

Specification of Letters Patent No. 22,660, dated January 18, 1859.

*To all whom it may concern:*

Be it known that I, JOSEPH MANSFIELD, of Jefferson, in the county of Jefferson and State of Wisconsin, have invented a new and useful Implement, which I denominate a "Milk-Cooler," for the Purpose of Cooling Milk and other Liquids; and I hereby declare the following to be a full and true description thereof, reference being had to the drawings herewith presented, which drawings constitute a part of said description.

The object of my invention is to enable the farmer to cool his milk in a short time and with less labor than the usual way. By this means it may be transferred to any distance by railroad without the least danger of change.

The old method of placing the milk in pans or other vessels standing in water is always attended with inconvenience and loss of time, besides it does not cool the milk down to the same temperature as that of the cold water by reason of the water constantly growing warmer; and hence it is requisite to use a much greater quantity of water than that of the milk to be operated on.

By the use of my cooler any quantity of milk may have its caloric transferred to an equal quantity of cold water and the milk is made to run off at one pipe of the vessel as cold as spring water; while the water is drawn off at the opposite side about as warm as the milk was before the operation.

To enable others to make and use my invention I proceed to describe its construction and use. See the drawing.

Figure 1 shows a perspective view of the milk vessel. Fig. 2 is a top view of the same. Fig. 3 is a section of the same showing the interior arrangement.

Similar letters indicate similar parts in all the figures.

(T, T, T,) are small tubes placed in a disk of tin or other metal, (D,) and at the lower end of these there is another disk ($D^2$). These tubes are all soldered into each disk and the disks are soldered into the vessel (V,) having a considerable space around and between the tubes. This space is filled with cold water which is drawn in at the water-pipe (W,) near the bottom of the tubes, and passes upward running off at top by the side pipe (S,). This pipe leads down to the bottom and operates as a siphon in discharging the water at (Y.). There is a stop cock at (N,) connected to the lowest part of the bottom of the vessel (V,) to discharge the milk. The red lines show where the water vessel may be placed. It may be a common pail or bucket connected to the milk vessel by the connecting cock (W.). Now it may be observed that the water enters by the pipe (W,) at the lowest part of the tubes and passes upward, and the milk being poured in at top passes down through all the tubes until the space below the disk ($D^2$,) is filled; thus the milk is surrounded by cold water and by increasing the number or length of the tubes any requisite cooling surface may be obtained in proportion to the quantity of milk to be cooled. Now on opening the cocks the milk passes downward growing cooler as it comes in vicinity of colder water, and as the water grows warmer it passes upward coming in contact with warmer milk until it finally passes off with the temperature of warm milk.

What I claim as my invention is—

The improved, portable milk cooler, when constructhed in the maner and for the purpose set forth.

In testimony whereof I hereto subscribe in presence of two witnesses.

JOSEPH MANSFIELD.

Witnesses:
GEO. PORTER PAULL,
ISAAC SAVAGE.